United States Patent [19]

Howell

[11] Patent Number: 5,075,061

[45] Date of Patent: Dec. 24, 1991

[54] MANUFACTURE OF EXTRUDED PRODUCTS

[75] Inventor: Barry G. Howell, Chester, England

[73] Assignee: BICC Public Limited Company, England

[21] Appl. No.: 607,667

[22] Filed: Nov. 1, 1990

[51] Int. Cl.$^5$ .............................................. B29C 47/06
[52] U.S. Cl. .................................... 264/171; 264/174; 264/211.24; 264/236; 264/347; 425/113
[58] Field of Search ................... 264/211.24, 236, 347, 264/174, 211, 171; 425/113, 382.3

[56] References Cited

U.S. PATENT DOCUMENTS

| | | | |
|---|---|---|---|
| 4,015,828 | 4/1977 | Miles | 264/349 |
| 4,117,063 | 9/1978 | Voigt et al. | 264/174 |
| 4,182,601 | 1/1980 | Hill | 425/382.3 |
| 4,338,274 | 7/1982 | Hill | 425/382.3 |
| 4,595,546 | 6/1986 | Wheeler, Jr. | 425/382.3 |
| 4,793,957 | 12/1988 | Lovegrove | 264/211 |
| 4,814,130 | 3/1989 | Shiromatsu et al. | 264/211.24 |
| 4,857,250 | 8/1989 | Gale et al. | 264/174 |

FOREIGN PATENT DOCUMENTS

| | | | |
|---|---|---|---|
| 54-52155 | 4/1979 | Japan | 264/236 |
| 57-23650 | 2/1982 | Japan | 264/174 |
| 58-142834 | 8/1983 | Japan | 264/236 |
| 60-172110 | 9/1985 | Japan | 425/113 |
| 61-228925 | 10/1986 | Japan | 425/376.1 |
| 1601698 | 11/1981 | United Kingdom . | |

Primary Examiner—Jeffery Thurlow
Attorney, Agent, or Firm—Oliff & Berridge

[57] ABSTRACT

Polymeric material is plastified in an extruder and is then divided into a major part and a minor part. Either the major part or (more often) the minor part is modified by a chemical reaction, such as grafting (any necessary ingredients being added, if not already present). The major and minor parts are then recombined in an extrusion head so that the modified and unmodified materials form distinct parts of the product. In this way, a single extruder can be used to make, for instance, a product with surface characteristics modified by grafting, wire-covering with only a surface layer crosslinked, or heat-sealable crosslinked packaging film.

2 Claims, No Drawings

MANUFACTURE OF EXTRUDED PRODUCTS

This invention relates to the manufacture by extrusion of products made wholly or in part from polymeric materials, and more especially to electric cables, pipes and the like.

The art of formulating polymeric materials to secure desired properties is well developed, but the design of particular formulations often entails compromise between the properties needed in different parts of the extruded product; for example, abrasion resistance (needed only at exposed surfaces) can often be gained at the expense of reduced flexibility.

Compromise of this kind can, of course, be avoided by using two (or more) different polymeric compositions, but this entails the use of a separate extruder for each composition, or at least two operations using the same extruder, either of which is expensive. Additionally, if two extruders are used to feed to a common extrusion head (which is the most satisfactory way of getting good adhesion between the materials) the machines need to be set up with their screw axes at considerable angles to one another (for example at right angles) and this makes efficient floor layout difficult if the line is to be incorporated in a standard rectangular building amongst a number of simple extrusion lines.

It has been known for some years that extruded products with a separate surface layer of pigmented material can be obtained at relatively low cost by bleeding off a minor part of the output of an extruder, mixing it with a suitable pigment and reinjecting it to the head of the extruder so as to form the outer layer, and plant from this purpose is commercially available (for example from Francis Shaw Ltd of Manchester). However, it has not hitherto been recognised that this technique could be adapted to provide surface layers, or other portions, that differed in more than the presence or quantity of some admixed ingredient.

In accordance with the present invention, a process for the manufacture of an extruded product comprising the steps of plastifying a polymeric material in an extruder, separating it into a major part and a minor part, modifying one of the said parts and passing both the said parts to an extrusion head so that the modified and unmodified polymeric materials form distinct parts of a product formed by extrusion therefrom is characterised by the fact that the plastified polymeric material is modified by a chemical reaction.

Appropriate chemical reactions include the grafting of side-chains to the polymeric material to modify its chemical, physical, rheological and other properties, and the introduction of reactive sites for subsequent crosslinking.

The polymeric material may already be blended with appropriate compounding ingredients before the minor part is separated from it, or by suitable design of the extruder some compounding ingredients might be added to the major part after the minor part has been separated from it.

Separation of the minor part from the major can be controlled by a gear pump. In most cases, the incorporation of chemical reagents into the appropriate part of the polymeric material will be a precondition for useful chemical reactions, and this can be effected, in the case of the minor part, by injecting them, preferably in a liquid form, into a cavity transfer mixer. Chemical reaction may then take place in the mixer, in the extrusion head and/or in an interconnecting duct, and the material can be appropriately heated when the nature of the reaction requires it. In the case of the major part, mixing and chemical reaction can take place in a part of the extruder downstream of the separation point.

The following examples are given for the purpose of illustrating the invention only.

EXAMPLE 1

Freshly-drawn glass fibres have a high tensile strength, but this diminishes markedly over a period of time if the glass surface is exposed to the air, and a particular polymeric coating or matrix is conventionally used to protect the surfaces of glass fibre strength members. Polyethylene is inexpensive and readily available, and meets most of the property requirements, but is seriously deficient in the strength of its adhesion to the glass surface. Ethylene/acrylic acid copolymers adhere strongly to glass but are very expensive and have a lower softening point than polyethylenes.

In accordance with the invention, low density polyethylene of melt flow rate 2 (as received, without additives) is plasticised in a 90 mm 26D extruder fitted with a polyethylene type screw. Ten percent of the plastified material is withdrawn, using the gear pump supplied with the machine, and modified by injecting into it 2% (by volume) of acrylic acid with 0.2% (by weight) of dicumyl peroxide dissolved in it, mixing with a Francis Shaw cavity transfer mixer (driven independently of the extruder) and heating to a temperature of about 190° C. for about a minute to graft acrylic side-chains to the polyethylene. The grafted sidestream is then recombined with the unmodified mainstream in an extrusion cross-head so designed that a glass fibre strength member is coated with a thin inner layer of the modified polymer and a thicker outer layer of plain polyethylene.

This example can be modified by using high-density polyethylene, to achieve a result not readily available even with two extruders, since high density grades of ethylene/acrylic acid copolymer are not available on the market.

EXAMPLE 2

Plasticised polyvinyl chloride (PVC) is a widely used insulating/sheathing material for low voltage power cables, with many attractive properties; it suffers however from a low melting-point and mediocre abrasion resistance. These weaknesses can be significantly diminished by crosslinking, but this requires the use of considerable amounts (5-10%) of expensive additives that are liable to degrade the flame retardance of the material as well as needing, in nearly all cases, the use of irradiation techniques that are also expensive and limit the dimensions of the product.

In accordance with the invention, a conventional PVC formulation is plastified using the same apparatus as used in Example 1. Ten percent of the output is separated by the gear pump, and to this is added 5% by weight of (3,4 diamino-n-butyl) trimethoxy silane and trace amounts (around 0.02%) of dibutyl tin dilaurate. The mix is heated to about 200° C. for 1 minute to effect grafting of the silane to the polymer, and then recombined with the mainstream in a dual wire-covering crosshead so that the polymer so modified forms the outer skin of the wire covering. After exposure to water at 85° C. for 24 hours, the outer layer is usefully crosslinked and the wire is resistant to the abrasion encountered when drawn into conduit, and is also suitable for equipment wiring where there may be risk of short-term contact with a soldering iron as well as for service in high-temperature environments, such as under-bonnet vehicle wiring.

This example can be modified by using the other amino or imino silanes described in GB patent no. 1485263.

EXAMPLE 3

This is similar to Example 1, except that the two-layer extrusion is of much larger dimensions and is applied as the sheath of a cable over a thin metal foil moisture barrier (aluminium, lead, or copper). The acrylic-acid grafted polyethylene promotes adhesion and avoids the need to use a preformed metal plastics laminate.

EXAMPLE 4

This is similar to Example 3, except that the acrylic-acid grafted polyethylene forms the outer part of the two-layer extrusion, which is applied as dielectric on a television downlead cable; a copper tape is longitudinally applied to the still-soft extrudate with a longitudinal butt joint, relying on the strong adhesive bond between the graft polymer and the copper tape to ensure an adequately loss-free joint.

EXAMPLE 5

The heat resistance of polyethylene packaging film can be dramatically improved by crosslinking, but this entails difficulty, if not total impossibility, in making heat seals.

In accordance with the invention, low density polyethylene of melt flow rate 2 containing about 0.05% dibutyl tin dilaurate is plastified in the first section of a specially designed 30D extruder with a barrier type homogenising screw. The machine is vented at a point 10D from the inlet, and at this point ten percent of the plastified material is bled off, as in the previous examples; however, in this case this minor part of the material is directly fed by the gear pump to the extrusion head, and it is the main stream of polymer remaining in the extruder which is modified.

At a point about 2D beyond the separation point, there is injected into the polymer a solution comprising 0.265% dicumyl peroxide in 2.5% vinyl trimethoxysilane (percentages being by weight of the polymer) and after the mixture has been uniformly blended by the homogenising zone of the extruder screw the temperature is raised to about 230° C. to graft the silane to the polymer. The mainstream and sidestream are now recombined in a film-blowing crosshead in such a way that at least one surface of the film is constituted by the unmodified sidestream material. After standing in moist ambient atmosphere for a week or so, the modified polymer becomes crosslinked by a silanol condensation reaction, but the surface formed by unmodified polymer remains fully heat-sealable.

EXAMPLE 6

Polypropylene, coloured orange with a commercial colourant masterbatch is plastified in a single-screw extruder at 180° C. About 28% is extracted, using a gear pump as in the previous examples, near the end of the extruder barrel and fed to an independently-driven cavity transfer mixer. A liquid mixture of 10 parts by weight trimethylolpropane trimethacrylate, 1 part by weight 4'-benzoyl-3'-hydroxy-2-phenoxyethyl acrylate (BHPEA) and 0.02 parts by weight dicumyl peroxide was injected into the cavity transfer mixer using a metering pump and a positive displacement injector at a rate of 1.2 parts of mixture per hundred parts of polymer (by weight); the residence time in the cavity transfer mixer was 2 minutes. The output of the cavity transfer mixer and the remaining output of the extruder were fed through separate passages to a common crosshead and applied as concentric layers to a copper wire 1 mm in diameter to from a brightly-coloured farm-wiring cable with the unmodified polypropylene forming the inner layer (notionally insulation) and the modified polypropylene from the cavity transfer mixer forming an outer, integral sheathing layer. The total radial thickness of polypropylene was about 1 mm, of which about 0.02 mm was modified to render it resistant to ultraviolet light and thus enable the cable to be used outdoors. Analysis by UV spectroscopy on samples shaved from the outer layer and extracted with dichloromethane showed that about 0.73% of BHPEA was not extractable, i.e. was grafted to the polymer; this represents nearly three-quarters of the BHPEA consumed.

I claim:

1. A process for the manufacture of an extruded product comprising the steps of plastifying a polymeric material in an extruder, separating it into a major part and a minor part, modifying one of the said parts by subjecting it to a chemical reaction comprising the grafting of sidechains to said polymeric material and passing both the said parts to an extrusion head so that the modified and unmodified polymeric materials form distinct parts of a product formed by extrusion therefrom.

2. A process as claimed in claim 1 in which the said sidechains introduce into said polymeric material active sites for subsequent crosslinking.

* * * * *